United States Patent
Candelore et al.

(10) Patent No.: US 8,885,829 B2
(45) Date of Patent: Nov. 11, 2014

(54) ANTIPIRACY KEY SEGMENTATION FOR HFC MULTICAST DISTRIBUTION FROM MASTER HEADEND TO CABLE HUBS

(75) Inventors: Brant L. Candelore, San Diego, CA (US); Leo M. Pedlow, Jr., Ramona, CA (US); Steven Richman, San Diego, CA (US); Frederick J. Zustak, Poway, CA (US)

(73) Assignee: Sony Corporation, Tokyo (JP)

( * ) Notice: Subject to any disclaimer, the term of this patent is extended or adjusted under 35 U.S.C. 154(b) by 1086 days.

(21) Appl. No.: 12/887,642

(22) Filed: Sep. 22, 2010

(65) Prior Publication Data

US 2011/0096924 A1 Apr. 28, 2011

Related U.S. Application Data

(60) Provisional application No. 61/254,109, filed on Oct. 22, 2009.

(51) Int. Cl.
 *H04L 9/00* (2006.01)
 *H04L 29/06* (2006.01)
 *H04N 7/167* (2011.01)

(52) U.S. Cl.
 CPC ............ *H04L 63/0428* (2013.01); *H04N 7/167* (2013.01)
 USPC ............................ 380/259; 380/255; 380/256

(58) Field of Classification Search
 CPC .............................. H04L 63/0428; H04N 7/167
 USPC ........................................................ 380/256
 See application file for complete search history.

(56) References Cited

U.S. PATENT DOCUMENTS

| | | | | |
|---|---|---|---|---|
| 6,564,056 | B1 * | 5/2003 | Fitzgerald | 455/435.1 |
| 7,233,669 | B2 | 6/2007 | Candelore | |
| 8,359,392 | B2 * | 1/2013 | Garbajs et al. | 709/227 |
| 8,572,660 | B2 * | 10/2013 | Riley et al. | 725/63 |
| 2004/0123094 | A1 | 6/2004 | Sprunk | |
| 2004/0151323 | A1 * | 8/2004 | Olkin et al. | 380/280 |
| 2005/0169473 | A1 | 8/2005 | Candelore | |
| 2009/0132805 | A1 * | 5/2009 | Ginter et al. | 713/150 |
| 2009/0208006 | A1 | 8/2009 | Candelore | |
| 2010/0086133 | A1 * | 4/2010 | Asano et al. | 380/255 |
| 2013/0036059 | A1 * | 2/2013 | Oura et al. | 705/71 |

OTHER PUBLICATIONS

Google Search Results, Nov. 8, 2013.*
"PSIP: Program and System Information Protocol", Mark Eyer, pp. 23-28, The McGraw-Hill Companies, 2003.

* cited by examiner

*Primary Examiner* — Arvin Eskandarnia
(74) *Attorney, Agent, or Firm* — Miller Patent Services; Jerry A. Miller

(57) ABSTRACT

A method of segregating a hybrid fiber cable network involves assigning a packet identifier (PID) to each of a plurality of hubs on the hybrid fiber cable network; assigning a distinct decryption method to each of the plurality of hubs, so that each of the plurality of hubs is identifiable by its associated decryption method and PID; generating selectively multiple encrypted content for transmission to the hubs, where content encrypted for use by each hub is identified by the hub's assigned PID; and transmitting the selectively multiple encrypted content over the hybrid fiber cable network to the plurality of hubs. This abstract is not to be considered limiting, since other embodiments may deviate from the features described in this abstract.

17 Claims, 5 Drawing Sheets

ANTIPIRACY KEY SEGMENTATION FOR HFC MULTICAST DISTRIBUTION FROM MASTER HEADEND TO CABLE HUBS

CROSS REFERENCE TO RELATED DOCUMENTS

This application is related to and claims priority benefit of U.S. Provisional Patent Application No. 61/254,109 filed Oct. 22, 2009 which is hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Cable operators such as Comcast, Time Warner, Cablevision and Cox are increasing moving to Hybrid Fiber Coax (HFC) distribution. They are eliminating independent distribution of content from the program providers to the cable systems in favor of receiving the content at a master headend—satellite descrambling it, grooming it, and access controlling and distributing MPEG2 transport packets (with MEPG2 and AVC content) via multi-cast Internet Protocol (IP) packets to the hubs (e.g., Motorola SEM or APEX device) where the IP packets are received. The transport packets of content are then removed from the IP packets at the cable hub and sent into the RF cable system (QAM modulated and up-converted onto an RF carrier).

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
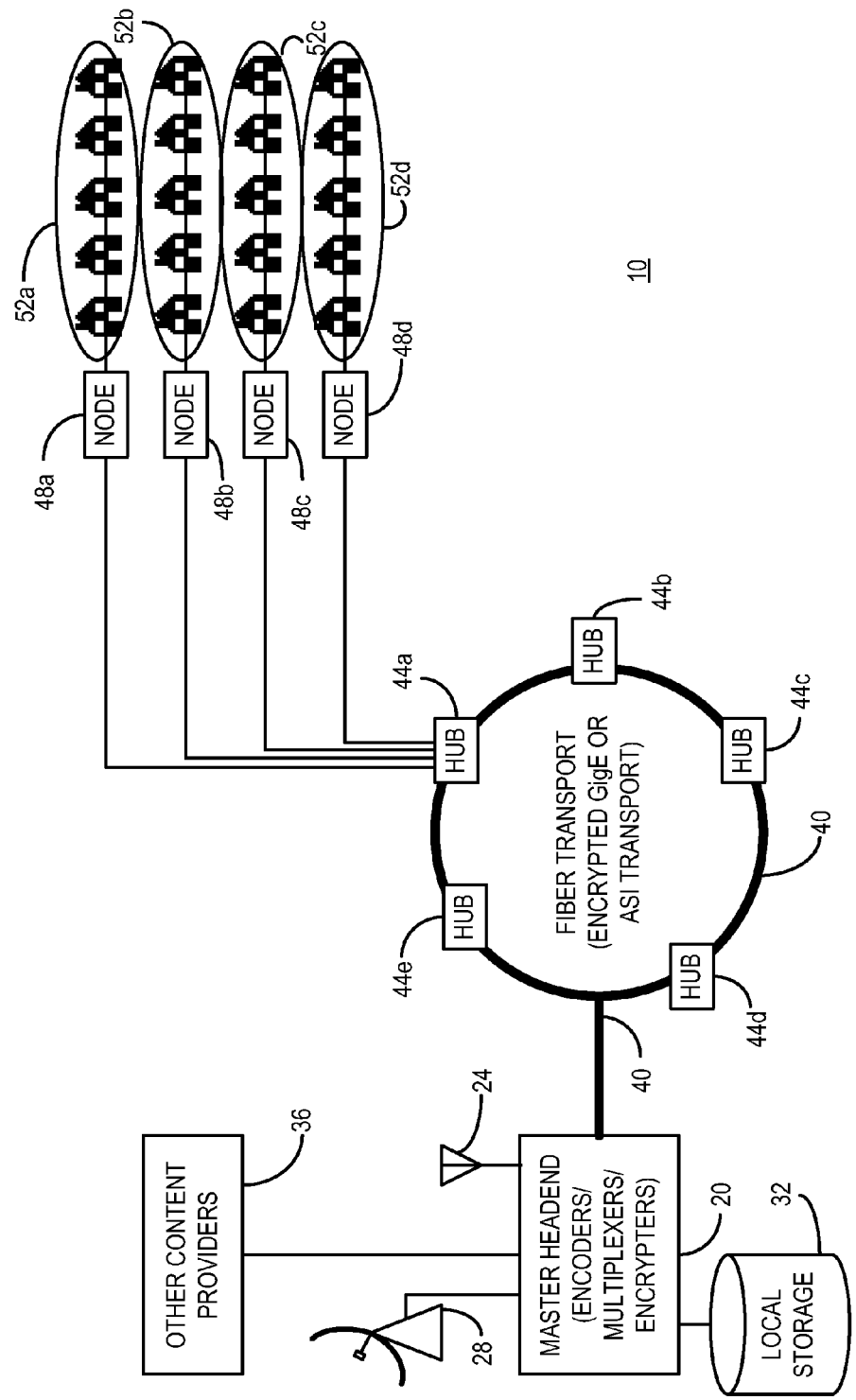
FIG. 1 is an example diagram depicting a cable system using hybrid fiber coax (HFC) distribution consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The terms "scramble" and "encrypt" and variations thereof are used synonymously herein. The term "critical" as used herein refers to a packet or group of packets or other segment of content that, when encrypted, renders a portion of a video image difficult or impossible to view if not properly decrypted, or which renders a portion of audio difficult or impossible to hear if not properly decrypted. The term "critical" should not be interpreted as an absolute term, in that it may be possible to hack an elementary stream to overcome encryption of a "critical packet", but when subjected to normal decoding, the inability to fully or properly decode such a "critical packet" would inhibit normal viewing or listening of the program content.

The term Selective Multiple Encryption is defined herein as encryption such as that described in U.S. Pat. Nos. 7,233,669 and 7,336,787 and 7,120,250 and referred to therein as either partial multiple encryption or multiple partial encryption. These patents are hereby incorporated by reference herein. The above-referenced commonly owned patents describe inventions relating to various aspects of methods generally referred to herein as partial encryption or selective encryption. More particularly, systems are described wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent or less of data overhead is needed to effectively encrypt the content using multiple encryption systems. This results in a cable or satellite system being able to utilize Set-top boxes or other implementations of conditional access (CA) receivers from multiple manufacturers in a single system—thus freeing the cable or satellite company to competitively shop for providers of Set-top boxes.

In the past, cable television systems had a level of inherent security because if a decoder was hacked in one system (e.g., Comcast, Time Warner, Cablevision and Cox), a cloned decoder could not be used in other competitive systems. This is because the key delivery to the original and clone decoder only pertained to the cable system from which the original came.

As previously noted, Cable operators such as Comcast, Time Warner, Cablevision and Cox are increasing moving to Hybrid Fiber Coax (HFC) distribution. They are eliminating independent distribution of content from the program providers to the cable systems in favor of receiving the content at a master headend—satellite descrambling it, grooming it, and access controlling and distributing MPEG2 transport packets (with MEPG2 and AVC content) via multi-cast Internet Protocol (IP) packets to the hubs (e.g., Motorola SEM or APEX device) where the IP packets are received. The transport packets of content are then removed from the IP packets at the cable hub and sent into the RF cable system (QAM modulated and up-converted onto an RF carrier).

FIG. 1 depicts an example of such a HFC distribution system 10 where the content can be thought of as originating at a master headend 20 that receives content from broadcasters via antenna 24 or other links, satellite links via satellite dishes 28, locally stored content such as pay per view content at 32 or other sources of content shown generally as 36. The content, regardless of source is encoded, multiplexed and encrypted at master headend 20 and sent out for distribution as Internet Protocol packets using high bandwidth HFC distribution links depicted as 40 (shown as a ring, but this is not necessarily representative of the actual topology).

The content of the packets are then received at each of a plurality of hubs such as 44a, 44b, 44c, 44d and 44e. The signal is QAM modulated onto an RF carrier at the hubs 44 for distribution to the various nodes (such as 48a, 48b, 48c and 48d) and branches of the cable network for final distribution to a group of homes or other ultimate target users such as 52a, 52b, 52c and 52d. It will be understood that each hub serves any suitable number of nodes and each node services any suitable number of homes, and the present drawing is simplified for ease of understanding.

One problem with HFC distribution is that if all the content is encrypted the same way at the master headend, keys obtained from a hacked receiver will be useful everywhere the content is delivered. Right now, the major cable operators are able to provide services to many millions of subscribers. This could pose a long term security problem if this is not addressed. It is noted that a viable piracy business has been established when systems serviced only a few hundred thousand customers.

Hence if system 10 is used in this manner with common encryption at the master headend for all recipients of the content, a breech of the encryption by hacking the encryption key or other means at a target (e.g., a user in 52a) means that the security of the entire system 10 would be compromised. By cloning the hacking receiver (e.g., a set top box (STB)), any of the content of the system fed by the HFT and master headend 20 would be subject to piracy. It should be noted that the example system 10 is drastically simplified for clarity, but the master headend 20 could serve thousands of hubs 44 over an extremely wide geographic area. The ability to hack into such a large system, renders the potential profitability of a hacking operation extremely high and thereby extremely attractive to a potential hacker.

In order to reduce this risk, a modified form of selective multiple encryption (SME) can be used at the master headend under a single conditional access (CA) or digital rights management (DRM) system (or multiple CA or DRM systems). The content is Selectively Multiple Encrypted (SME) using Motorola or Cisco (the two largest incumbent providers in the U.S.) proprietary encryption, or using any other suitable encryption method. Multiple keys or multiple encryption methods can be used (and are considered equivalent). Each alternate encryption is associated with a particular hub or segment of the cable system that serves a limited population. The hub selects the encrypted content of interest and the clear content and then passes a selectively encryption (SE) using all primary packet identifiers (PIDs), or the SE content with primary and secondary PIDs can be passed through from the hub to the set-top boxes. And the hub or segment would use packet swapping to replace the secondary PIDs with primary PIDs, or alternatively, the set-top boxes would use packet swapping to replace the secondary PIDs with primary PIDs.

It is noted that in SME as originally developed and described in the applications listed above, each encryption and PID is associated with a brand of STB that is compatible with that particular encryption. However, in this case, the encryption and PID are associated with a network hub 44, or even potentially a node of the network. In the network 10, this suggests that five separate PIDs are needed for the selected content and hence the bandwidth is increased for the segment of content that is selected for encryption. While there is therefore a bandwidth price, it remains small compared with the high bandwidth available in a HFT transport, and is still dramatically less than if the entire content were encrypted multiple times for each hub or segment of the network.

Hence, in accord with certain implementations, a HFC scenario is provided for multicasting content, a hub corrects selective MSE with multiple PIDs (e.g., using packet swapping in the hub), and the set-top box does the decryption. DRM has some of the same security issues as CA. However, the client side may be more easily upgradable or updatable usually by only a software update. The implementation is "throw away" while a breach of the CA could have severe consequences because of its embedded nature and use of hardware security tokens. However, the present arrangement is equally applicable to DRM and CA systems.

Figure 2:
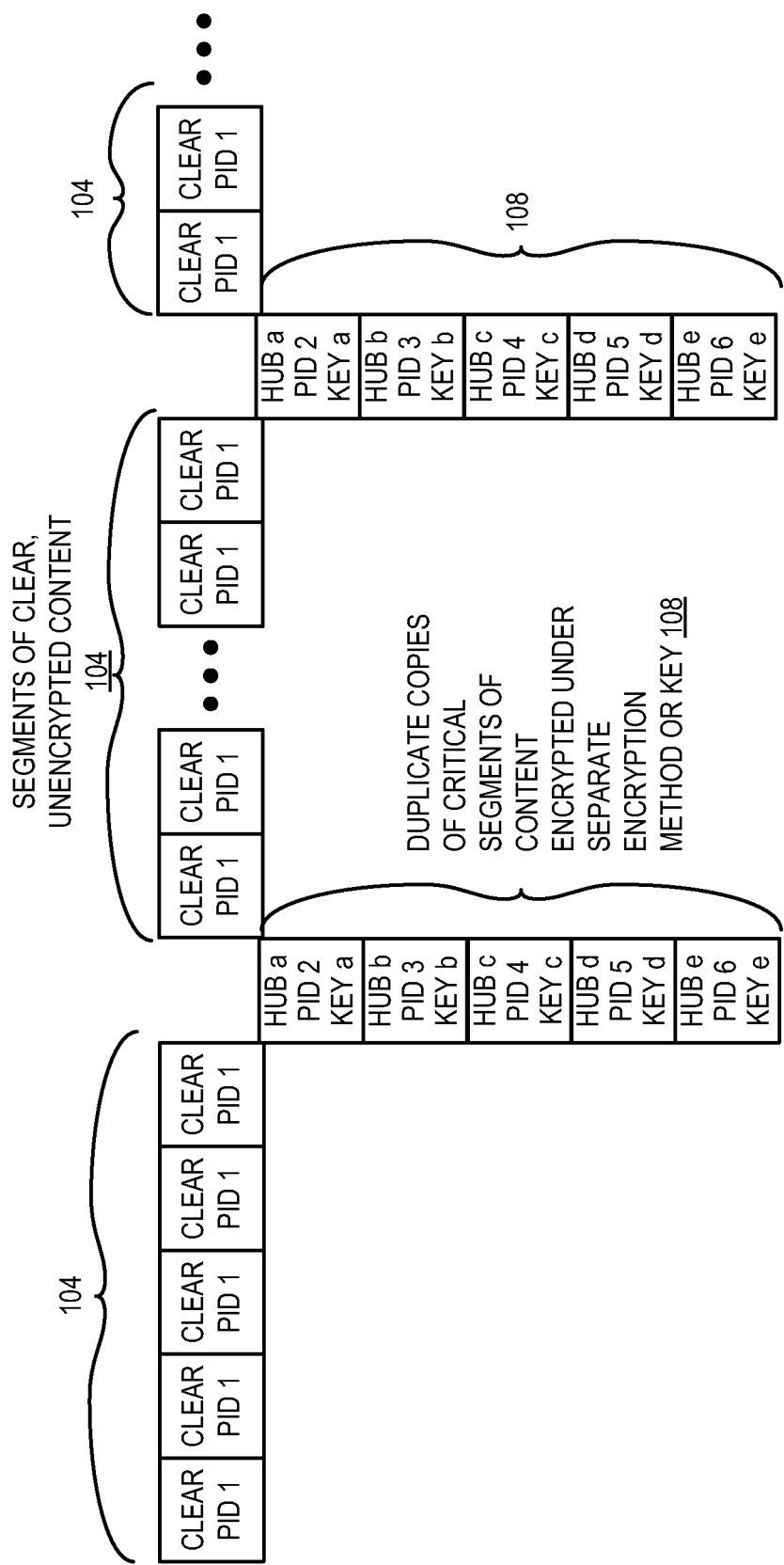
FIG. 2 illustrates an example selectively multiple encrypted stream of content with PIDs and encryption segregated by hub in a manner consistent with certain embodiments of the present invention.

If system 10 is used to as an example for implementation of a system in accord with the present teachings, the content would be selectively multiple encrypted as shown by way of example in FIG. 2. In this example a segment or packet of each stream of content (e.g., a television program) is analyzed to identify content which is considered "critical". These packets are then duplicated to produce a copy for each target hub and encrypted using a different encryption or key for each hub. Each copy is then re-inserted into the stream of content output at the master headend 20 for broadcast over the HFC network by the master headend 20. In this manner, a portion of the content 104 remains clear and unencrypted, while the duplicated and encrypted selected portions 108 are associated with a target hub 44 and are encrypted and assigned separate PIDs that identify their target hub. In this example, hub 44a is assigned PID 2 and encryption or key a, hub 44b is assigned PID 3 and encryption or key b, hub 44c is assigned PID 4 and encryption or key c, hub 44d is assigned PID 5 and encryption or key d, hub 44e is assigned PID 6 and encryption or key e.

In a variation of this process, separate PIDs and encryption methods could be assigned to a group of hubs to reduce the number of multiple copies of the encrypted content used, or separate PIDs and encryption methods could be assigned to any specified branch of the hubs including secondary nodes of the network. By making such a segregation by hub, if the content to one hub is compromised, the damage and potential for profit by the hacker is limited and the remainder of the network is secure. This reduces the incentive for a hacker to attempt to establish a business when there is uncertainty as to the size of his potential client base and applicability of the hacked receivers to any particular target client base.

Figure 3:
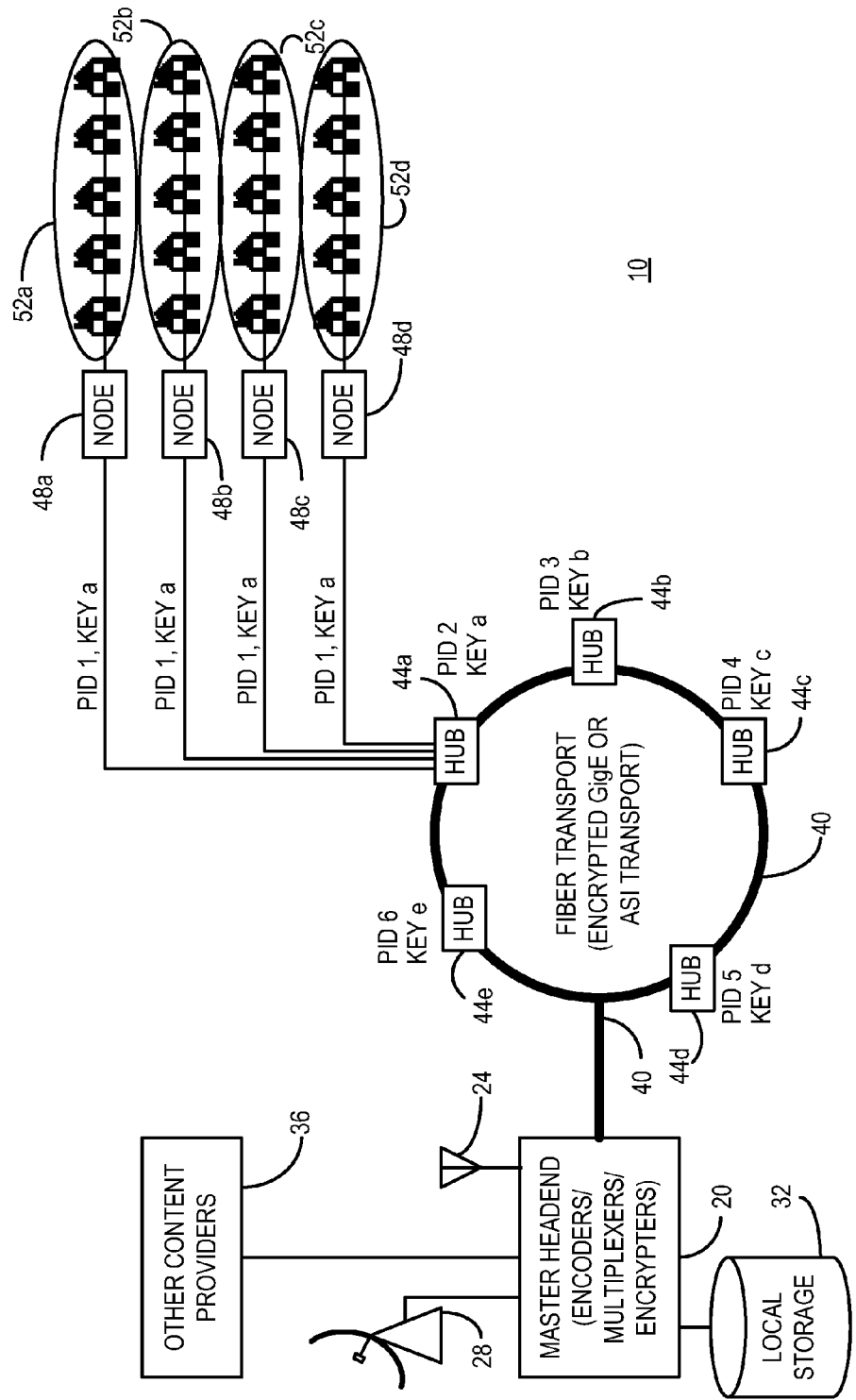
FIG. 3 is an example diagram depicting a cable system using hybrid fiber coax (HFC) distribution and showing the PID and encryption segregation in a manner consistent with certain embodiments of the present invention.

In accord with certain implementations, when the SME content is received at a particular HUB, a translation takes place that remaps the PIDs of the encrypted content to the same PID as the unencrypted content. This is depicted in FIG. 3 where content having PID 2 is PID remapped to PID 1 so that the encrypted is remapped to PID 1—the same PID as the clear content. In an equivalent variant, the PIDs for the content could be remapped to any available PID, or the receiver devices can be notified that content applicable to the program of interest appears on two or more PIDs. In another implementation, the PID remapping can be carried out at the TV receiver device such as a STB.

Hence, as discussed, a breach in one segment of a system or one system will not affect other systems and other segments, because the encrypted content available to set-top boxes will be using different keys. In addition to alternate content encryption under a single CA provider, DRM content could be provided. This would prevent the leakage of secrets from a poorly implemented DRM implementation from compromising the CA technology by keeping keys separate.

Figure 4:
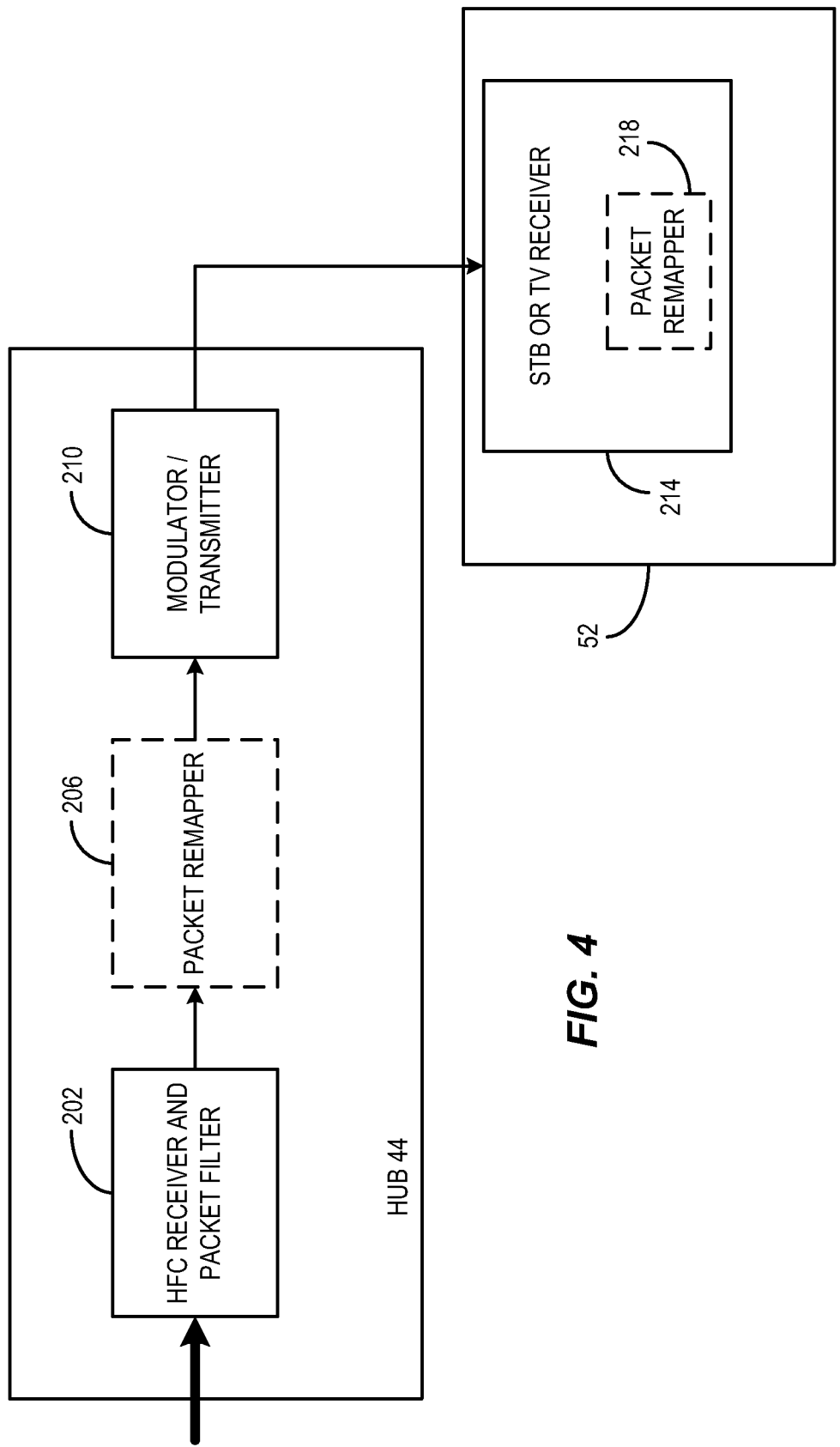
FIG. 4 is an example block diagram of an example hub and receiver device consistent with certain embodiments of the present invention.

FIG. 4 depicts the basic components of a hub 44, which serves to receive packets over the HFC network and filter out packets that are not intended for the particular hub 44 at receiver and packet filter 202. The packet remapping can be carried out at a packet remapper 206 that operates according to the state diagram of the above referenced patents. The main operational mode for decoding the SME content is preferably the INSERTION mode as described in the above patents, since all hubs could be enabled for SME. For certain providers, most set-top boxes will be enabled to decrypt SME content since currently used Broadcom decoders are enabled for INSERTION mode operation. If any legacy set top box (STB) is not SME enabled, then SUBSTITUTION mode can be used. INSERTION mode is somewhat easier to implement since there is no special packet ordering (and number of packets) to be considered vis-a-vis a primary packet. INSERTION mode has no primary packet that gets replaced.

Once the packet swapping has been carried out at 206, the content is modulated, e.g., using quadrature amplitude modulation (QAM) at modulator 210 for delivery to the households or other target recipients 52 on the cable network. It is noted that as previously mentioned, the packet remapping at 206 is optional ad depicted by the dashed lines of block 206 and could equally well be carried out at the ultimate target recipient 52, for example in a television receiver device such as a television STB 214 having a decoder that remaps packets 218. Both 206 and 218 are shown in dashed lines to indicated that one or the other is active, but not necessarily both.

Figure 5:
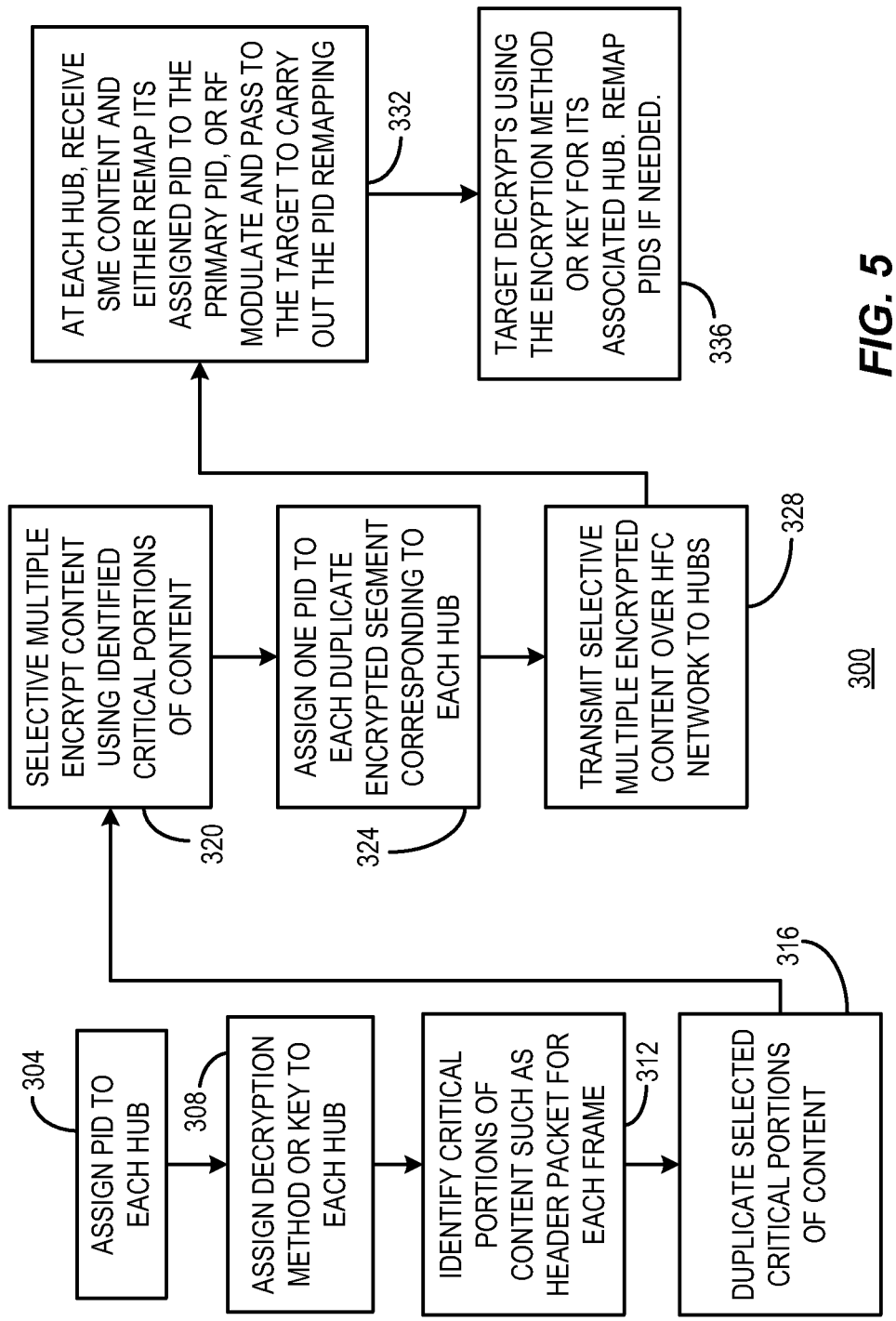
FIG. 5 is an example flow chart of a process consistent with certain embodiments of the present invention.

Referring now to FIG. 5, a process 300 is depicted which characterizes an implementation of the process described where each hub is assigned a PID that identifies the hub at 304. It is noted that this PID can be dynamically assigned and changed on a periodic basis if that proves advantageous or desirable. A decryption method or decryption key is associated with each hub (or other network segment branch) at 308 to segment the encryption in the network by hub or other network branch dividing point. The content is SME encrypted by first identifying critical portions of the content such as the header packet for each frame at 312 (or any other critical packet, keeping in mind the present definition of "critical") and the critical packets or portions of content are duplicated at 316. These selected critical packets are encrypted and recombined with the clear unselected content to produce selective multiple encrypted content at 320.

It should be noted that the process of producing SME content is most easily conceptualized by first duplicating and then encrypting, but this can be equivalently be accomplished by storing the critical content in one location and using that single stored content to produce multiple encrypted copies that are then inserted into the stream to produce the SME content.

At 324, one PID is assigned to each duplicate encrypted segment corresponding to each hub or other network branch, and the SEM content is then transmitted to the hubs 44 over the HFC network at 328.

At each hub 44, the SME content is received and either PID remapped to a single primary PID or passed along after modulation to RF to the target at 332. The target then decrypts using the encryption method or key associated with its source associated hub at 336. In the event the hub does not carry out the PID remapping, that may be carried out at 336 at the target receiver.

Hence, embodiments consistent with the present invention use antipiracy key segmentation in a multicast cable distribution system. Lately, there has been an increase in usage of Hybrid Fibre Coaxial (HFC) cables for cable distribution. Usage of HFC has eliminated independent distribution of content from the program providers to the cable systems. Generally, the program contents are received at a master Headend, where the content is descrambled and transmitted to the cable hubs in form of Internet Protocol packets. In such distribution all the content is encrypted using a single key. Such distribution has reduced security as a breach in security of one system would put all the other receiving systems risk as all the systems are using the same key to decrypt the content. Using implementations consistent with certain embodiments of the present invention using multiple selective encryption techniques at the master Headend provides unique encrypted content for each hub without considerably increasing the bandwidth requirement. This way key segmentation is maintained just like a more traditional all cable distribution system. Further, in multiple encryptions, DRM may be provided as one of the alternate encryption. This is accomplished by use of Selective Multiple Encryption at the master headend of a multicast cable distribution system utilizing HFC distribution as herein described.

It is further noted that a plurality of PIDs and decryption methods or keys can be assigned to a single hub, and the network further subdivided by node or lower level network branch without departing from implementations consistent with embodiment of the present invention/

Thus, one method of segregating a hybrid fiber cable network in a manner consistent with certain implementations involves assigning a packet identifier (PID) to each of a plurality of hubs on the hybrid fiber cable network; assigning a distinct decryption method to each of the plurality of hubs, so that each of the plurality of hubs is identifiable by its associated decryption method and PID; generating selectively multiple encrypted content for transmission to the hubs, where content encrypted for use by each hub is identified by the hub's assigned PID; and transmitting the selectively multiple encrypted content over the hybrid fiber cable network to the plurality of hubs.

In certain implementations, a plurality of the encryption methods utilize a common encryption and decryption algorithm and is decoded with a different decryption key. In certain implementations, a plurality of PIDs and encryption methods are assigned to at least one hub. In certain implementations, the method further involves receiving the transmitted selectively multiple encrypted content over the hybrid fiber cable at one of the plurality of hubs; and remapping the PIDs of the content so that encrypted content shares a PID with unencrypted content to produce remapped content. In certain implementations, the method further involves at the one of the plurality of hubs, filtering the selective multiple encrypted content to remove encrypted content with PIDs that are not associated with the one of the plurality of hubs. In certain implementations, the method further involves modulating the remapped content to an RF signal at the hub and transmitting the remapped content to target recipients over a cable network. In certain implementations, the method further involves receiving the transmitted selectively multiple encrypted content over the hybrid fiber cable at one of the plurality of hubs; and modulating the content to an RF signal at the hub and transmitting the content to target recipients over a cable network. In certain implementations, the method further involves at the one of the plurality of hubs, filtering the selective multiple encrypted content to remove encrypted content with PIDs that are not associated with the one of the plurality of hubs. In certain implementations, the method further involves remapping the PIDs of the content at the target recipient so that encrypted content shares a PID with unencrypted content to produce remapped content. In certain implementations, the method further involves at the one of the plurality of hubs, filtering the selective multiple encrypted content to remove encrypted content with PIDs that are not associated with the one of the plurality of hubs.

Another method of segregating a hybrid fiber cable network, involves assigning a packet identifier (PID) to each of a plurality of hubs on the hybrid fiber cable network; assigning a distinct decryption method to each of the plurality of hubs, so that each of the plurality of hubs is identifiable by its associated decryption method and PID, where a plurality of the encryption methods utilize a common encryption and decryption algorithm and is decoded with a different decryption key; generating selectively multiple encrypted content for transmission to the hubs, where content encrypted for use by each hub is identified by the hub's assigned PID; transmitting the selectively multiple encrypted content over the hybrid fiber cable network to the plurality of hubs; receiving the transmitted selectively multiple encrypted content over the hybrid fiber cable at one of the plurality of hubs; at the one of the plurality of hubs, filtering the selective multiple encrypted content to remove encrypted content with PIDs that are not associated with the one of the plurality of hubs; remapping the PIDs of the content so that encrypted content shares a PID with unencrypted content to produce remapped content; and quadrature amplitude modulating the remapped content to an RF signal at the hub and transmitting the remapped content to target recipients over a cable network.

In certain implementations, a plurality of PIDs and encryption methods are assigned to at least one hub. In certain implementations, the method further involves receiving the transmitted selectively multiple encrypted content over the hybrid fiber cable at one of the plurality of hubs; and modulating the content to an RF signal at the hub and transmitting the content to target recipients over a cable network.

A hybrid fiber cable network consistent with certain implementations has a plurality of hubs having a packet identifier (PID) assigned to each of a plurality of hubs on the hybrid fiber cable network, where a distinct decryption method is assigned to each of the plurality of hubs, so that each of the plurality of hubs is identifiable by its associated decryption method and PID. A master cable headend generates selectively multiple encrypted content and transmits the selectively multiple encrypted content to the hubs, where content encrypted for use by each hub is identified by the hub's assigned PID.

In certain implementations, a plurality of the encryption methods utilize a common encryption and decryption algorithm and is decoded with a different decryption key. In certain implementations, a plurality of PIDs and encryption methods are assigned to at least one hub. In certain implementations, at least one hub further has a PID remapper that remaps the PIDs of the content so that encrypted content shares a PID with unencrypted content to produce remapped content. In certain implementations, at the one of the plurality of hubs, a filter that filters the selective multiple encrypted content to remove encrypted content with PIDs that are not associated with the one of the plurality of hubs. In certain implementations, at least one hub further comprises a modulator that modulates the content to an RF signal and a transmitter that transmits the remapped content to target recipients over a cable network.

In another implementation, a hybrid fiber cable hub has a fiber receiver that receives selectively multiple encrypted packets including encrypted and clear packets over a fiber network from a master headend. The hub has an assigned packet identifier (PID) associated therewith, and the hub having one of a plurality of distinct decryption methods assigned thereto, so that when a plurality of hubs is attached to fiber, each is the identifiable by its associated decryption method and PID. A PID remapper remaps the PIDs of received packets content so that encrypted content shares a PID with unencrypted content to produce remapped content. A modulator modulates the content to an RF signal. A transmitter transmits the remapped content to target recipients over a cable network.

In certain implementations, the plurality of the decryption methods utilize a common encryption and decryption algorithm and is decoded with a different decryption key. In certain implementations, a plurality of PIDs and encryption methods are assigned to the hub. In certain implementations, a filter filters the selective multiple encrypted content to remove encrypted content with PIDs that are not associated with the one of the plurality of hubs.

A computer readable electronic storage medium such as a tangible non-transitory computer readable electronic storage medium can instructions which, when executed on one or more programmed processors, carry out any of the methods described herein.

Those skilled in the art will recognize, upon consideration of the above teachings, that certain of the above exemplary embodiments may be based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Conversely, certain embodiments herein were described in conjunction with specific circuitry that carries out the functions described, other embodiments are contemplated in which the circuit functions are carried out using equivalent executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A method of segregating a hybrid fiber cable network, comprising:
    assigning a packet identifier (PID) to each of a plurality of hubs on the hybrid fiber cable network;
    assigning a distinct decryption method to each of the plurality of hubs, so that each of the plurality of hubs is identifiable by its associated decryption method and PID;
    generating selectively multiple encrypted content for transmission to the hubs utilizing multiple encryption methods, where content encrypted for use by each hub is identified by the hub's assigned PID;
    transmitting the selectively multiple encrypted content over the hybrid fiber cable network to the plurality of hubs;
    receiving the transmitted selectively multiple encrypted content over the hybrid fiber cable at one of the plurality of hubs;
    remapping the PIDs of the content so that encrypted content shares a PID with unencrypted content to produce remapped content; and
    at the one of the plurality of hubs, filtering the selective multiple encrypted content to remove encrypted content with PIDs that are not associated with the one of the plurality of hubs.

2. The method according to claim 1, where a plurality of the multiple encryption methods utilize a common encryption and decryption algorithm and are decoded with multiple different decryption keys.

3. The method according to claim 1, where a plurality of PIDs and encryption methods are assigned to at least one hub.

4. The method according to claim 1, further comprising modulating the remapped content to an RF signal at the hub and transmitting the remapped content to the target recipient over a cable network.

5. The method according to claim 1, further comprising:
    modulating the content to an RF signal at the hub and transmitting the content to target recipients over a cable network.

6. A tangible non-transitory computer readable electronic storage medium storing instructions which, when executed on one or more programmed processors, carry out a method comprising:
    assigning a packet identifier (PID) to each of a plurality of hubs on the hybrid fiber cable network;
    assigning a distinct decryption method to each of the plurality of hubs, so that each of the plurality of hubs is identifiable by its associated decryption method and PID;
    generating selectively multiple encrypted content for transmission to the hubs utilizing multiple encryption methods, where content encrypted for use by each hub is identified by the hub's assigned PID;
    transmitting the selectively multiple encrypted content over the hybrid fiber cable network to the plurality of hubs;
    receiving the transmitted selectively multiple encrypted content over the hybrid fiber cable at one of the plurality of hubs;
    remapping the PIDs of the content so that encrypted content shares a PID with unencrypted content to produce remapped content; and
    at the one of the plurality of hubs, filtering the selective multiple encrypted content to remove encrypted content with PIDs that are not associated with the one of the plurality of hubs.

7. A method of segregating a hybrid fiber cable network, comprising:
    assigning a packet identifier (PID) to each of a plurality of hubs on the hybrid fiber cable network;
    assigning a distinct decryption method to each of the plurality of hubs, so that each of the plurality of hubs is identifiable by its associated decryption method and PID;
    generating selectively multiple encrypted content for transmission to the hubs, where content encrypted for use by each hub is identified by the hub's assigned PID;
    where a plurality of encryption methods are used to generate the selectively multiple encrypted content that utilize a common encryption and decryption algorithm but which is decoded using a different decryption key;
    transmitting the selectively multiple encrypted content over the hybrid fiber cable network to the plurality of hubs;
    receiving the transmitted selectively multiple encrypted content over the hybrid fiber cable at one of the plurality of hubs;
    at the one of the plurality of hubs, filtering the selective multiple encrypted content to remove encrypted content with PIDs that are not associated with the one of the plurality of hubs;
    remapping the PIDs of the content so that encrypted content shares a PID with unencrypted content to produce remapped content; and quadrature amplitude modulating the remapped content to an RF signal at the hub and transmitting the remapped content to target recipients over a cable network.

8. The method according to claim 7, where a plurality of PIDs and a plurality of encryption methods are assigned to at least one hub.

9. The method according to claim 7, further comprising:
receiving the transmitted selectively multiple encrypted content over the hybrid fiber cable at one of the plurality of hubs; and
modulating the content to an RF signal at the hub and transmitting the content to target recipients over a cable network.

10. A hybrid fiber cable network, comprising:
a plurality of hubs having at least one packet identifier (PID) assigned to each of a plurality of hubs on the hybrid fiber cable network;
where at least one distinct decryption method is assigned to each of the plurality of hubs, so that each of the plurality of hubs is identifiable by its associated decryption method and PID;
a master cable headend that generates selectively multiple encrypted content and transmits the selectively multiple encrypted content to the hubs, where content encrypted for use by each hub is identified by the hub's assigned PID; and
where at the one of the plurality of hubs, a filter that filters the selective multiple encrypted content to remove encrypted content with PIDs that are not associated with the one of the plurality of hubs.

11. The network according to claim 10, where a plurality of the encryption methods utilize a common encryption and decryption algorithm and is decoded with a different decryption key.

12. The network according to claim 10, where a plurality of PIDs and decryption methods are assigned to at least one hub.

13. The network according to claim 10, where at least one hub further comprises
a PID remapper that remaps the PIDs of the content so that encrypted content shares a PID with unencrypted content to produce remapped content.

14. The network according to claim 10, where at least one hub further comprises a modulator that modulates the content to an RF signal and a transmitter that transmits the remapped content to target recipients over a cable network.

15. A hybrid fiber cable hub, comprising:
a fiber receiver that receives selectively multiple encrypted packets including encrypted and clear packets over a fiber network from a master headend;
the hub having an assigned packet identifier (PID) associated therewith, and the hub having one of a plurality of distinct decryption methods assigned thereto, so that when a plurality of hubs is attached to fiber, each is identifiable by its associated decryption method and PID; and
a PID remapper that remaps the PIDs of received packets content so that encrypted content shares a PID with unencrypted content to produce remapped content;
a filter that filters the selective multiple encrypted content to remove encrypted content with PIDs that are not associated with the one of the plurality of hubs;
a modulator that modulates the content to an RF signal; and
a transmitter that transmits the remapped content to target recipients over a cable network.

16. The hub according to claim 15, where the plurality of the decryption methods utilize a common encryption and decryption algorithm and is decoded with a different decryption key.

17. The hub according to claim 15, where a plurality of PIDs and encryption methods are assigned to the hub.

* * * * *